United States Patent
Despain

[11] Patent Number: 5,934,698
[45] Date of Patent: Aug. 10, 1999

[54] ADJUSTABLE HITCH SUPPORT

[76] Inventor: Steven S. Despain, 1746 S. Sandhill Rd., Orem, Utah 84058

[21] Appl. No.: 08/658,174

[22] Filed: Jun. 4, 1996

[51] Int. Cl.[6] ....................................................... B60D 1/14
[52] U.S. Cl. ........................................................... 280/490.1
[58] Field of Search ................................. 280/490.1, 407, 280/491.3

[56] References Cited

U.S. PATENT DOCUMENTS

| | | | |
|---|---|---|---|
| 3,061,333 | 10/1962 | Sudeikis | 280/490.1 |
| 3,655,221 | 4/1972 | Warner | 280/490 |
| 3,664,686 | 5/1972 | Anderson | 280/490 |
| 3,700,254 | 10/1972 | Eck | 280/490.1 |
| 3,734,540 | 5/1973 | Thiermann | 280/482 |
| 4,033,601 | 7/1977 | Lindahl et al. | 280/490 |
| 4,266,799 | 5/1981 | Wood | 280/490.1 |
| 5,375,867 | 12/1994 | Kass et al. | 280/457 |
| 5,413,366 | 5/1995 | Gibbons | 280/490.1 |
| 5,465,991 | 11/1995 | Kass et al. | 280/457 |

FOREIGN PATENT DOCUMENTS 2040847  9/1980  United Kingdom ............... 280/490.1

Primary Examiner—David M. Mitchell
Attorney, Agent, or Firm—Madson & Metcalf

[57] ABSTRACT

A hitch support mechanism is positionable in a vertical direction to adjust for the hitch height of a trailing vehicle. The hitch support may be adapted to be removably attachable to a receiver fixed to a vehicle. The hitch support may be configured as a four-bar linkage in which a fixed link is secured by a trunnion to the receiver of a towing vehicle. A translating link may support directly attachment of a hitch, such as a ball hitch. Two rotating links, spaced from one another may extend parallel to one another. The rotating links connect the fixed link to the translating link. The rotating links each rotate about a respective axle, remaining parallel with respect to one another. An adjustment mechanism may fix the relative position of the translating link with respect to the fixed link. A system of apertures and a pin may provide a very compact adjustment mechanism, resulting in a light weight and compact envelope for the hitch support.

9 Claims, 3 Drawing Sheets

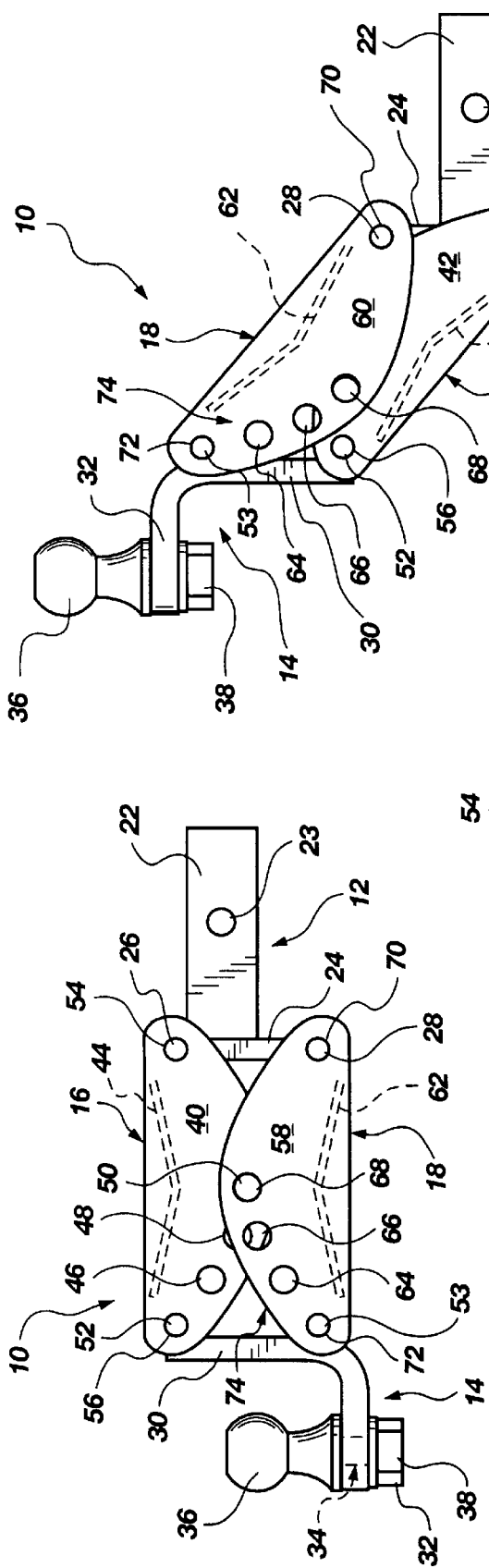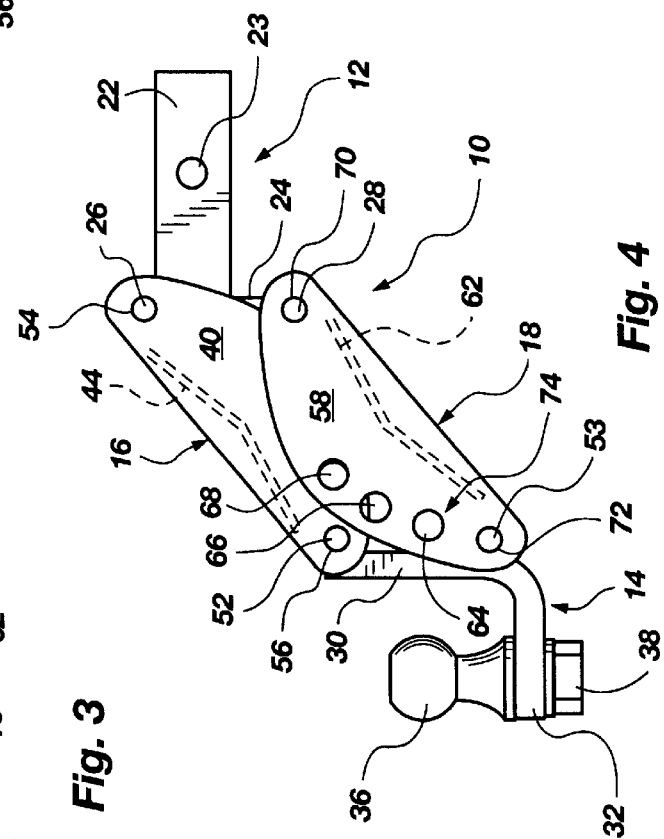

ADJUSTABLE HITCH SUPPORT

BACKGROUND

1. The Field of the Invention

This invention relates to hitches and, more particularly, to novel systems and methods for providing variability of the height of a hitch attached to a vehicle for towing another vehicle, such as a trailer.

2. The Background Art

Towing vehicles have existed since vehicles existed. Many times, a towing vehicle may be thought of as a tractor, where the towed vehicle is a trailer, trailing behind the tractor. Modern sport-utility vehicles such as four-wheel-drive pickup trucks and vans abound. Likewise, conventional pickup trucks, family automobiles, vans, and even motorcycles, are sometimes used as towing vehicles. In industry, and agriculture, tractors such as field tractors, wheeled tractors, tracked tractors, and semi-tractor trailer rigs may use hitches for trailing a vehicle.

A trailing vehicle has wheels on a axle establishing some height. A trailing vehicle also has a tongue by which the trailing vehicle is towed. The height at which a tongue is towed depends on the height of the hitch of a towing vehicle. Most hitches are fixed to a vehicle, not permitting any adjustment of height. Certain apparatus exists for mounting hitches needing an adjustable height.

Many such schemes are complex. Some are inherently weak. Some have a single member supporting the towing load and the hitch weight load of the trailing vehicle. If a single member fails in such a situation, a disaster of major or minor proportions may result. Also, adjustment of height by an assembly of members creates difficulties for a user in trying to put all members in proper registration with one another.

In the situation with sport-utility vehicles, and other vehicles towing recreational equipment such as boat trailers, house trailers, and the like, maneuverability may be important, yet dependent upon hitch height. For example, in putting a boat into a body of water, a user may desire to use a raised hitch height. Likewise, a user may wish to adjust hitch height according to the height of a loaded, versus an unloaded, trailer. Similarly, a single vehicle may tow different trailing vehicles on different occasions, each of which may come from a different manufacturer and possess some unique wheel or frame height. In such a circumstance, it is desirable to have a hitch height on the towing vehicle that corresponds to the tongue height established by the frame or axle height of the towed trailer.

What is needed is a durable, strong, easily adjustable, mounting mechanism for supporting a hitch on a vehicle. Ease of use, rapidity of adjustment, strength for supporting towing load and hitch weight, and simplicity of operation, are all desirable characteristics.

Size and weight for such a hitch support mechanism may be major considerations. A large envelope may exist in prior art devices to accommodate a long beam having multiple positions for moving a hitch support. A compact envelope with unused portions tucked neatly out of the way, or moving accordingly, would be advantageous. Moreover, large and bulky assemblies may be dangerous to users presenting sharp corners, and other apparatus over which to trip, or on which to injure oneself.

BRIEF SUMMARY AND OBJECTS OF THE INVENTION

In view of the foregoing, it is a primary object of the present invention to provide for a hitch support having multiple positions in a vertical direction.

It is another object of the present invention to provide a hitch mount readily adaptable to changing positions without removal from a vehicle.

It is another object of the present invention to provide a support having an adjustable height, preferably adjustable by a lone user.

It is another object of the present invention to provide a hitch support adjustable without disconnecting the hitch portion of the towing vehicle.

It is another object of the present invention to provide a hitch support adjustable by a single pin, yet failing safely if the pin fails, maintaining some reasonable height and maintaining the trailer secured to the towing vehicle.

It is another object of the present invention to provide a hitch support of sufficiently light weight as to be adapted to carrying by a single user, preferably in a single hand of a single user, and fitting into a compact space (envelope) in use or during storage.

It is another object of the present invention to provide a hitch mount adaptable to current mounting systems, such as receiver systems.

It is another object of the present invention to provide a hitch mount providing a bias in vertical position at each extreme of height, so as to be reversible, thus increasing the overall vertical range of positions available to the hitch portion without requiring of the mount portion to provide the total range of positions in a single motion.

It is another object of the present invention to provide a hitch mount system having no unused portions, regardless of position, thus having no extraneous parts outside the envelope of the functioning parts and functioning portions of engaged parts.

It is another object of the present invention to provide a four bar linkage having an arcuate array of apertures in one link positionable to match at least one aperture in another array of apertures in another link to form a rigidly triangulated structure supporting a hitch.

It is another object of the present invention to provide a hitch mount formed of a four-bar linkage arranged in a parallelogram arrangement, viewed in elevation, in which a single pin may resolve the parallelogram into a plurality of solid triangles forming a hitch support structure.

It is another object of the present invention to provide a hitch support mechanism that is automatically and continuously aligned in two dimensions, or two degrees of freedom, and is fixed in a third degree of freedom at a position selected by a user.

It is another object of the present invention to provide a hitch support formed of a first link having no degrees of freedom of motion, an opposite link movable only in translation within a plane, and a pair of parallel links each movable only in a circumferential degree of freedom.

Consistent with the foregoing objects, and in accordance with the invention as embodied and broadly described herein, a hitch mount is disclosed in one embodiment of the present invention as including a four-bar linkage. The base of the four bar linkage is attached in fixed relation to a towing vehicle. The translating element, opposite the fixed element, is adapted to receive a hitch attachment mechanism for towing a towed vehicle. The other two links extend between the fixed and translating portions of the hitch mount.

The rotating links, extending between the fixed portion and the translating portion, move in parallel, each about an axle associated with an axis of rotation. The translating portion, supporting the hitch proper, rotates with respect to each of the rotating members. Nevertheless, since each of the rotating members is translating with respect to the fixed member, the translating member may translate only. Thus, the orientation of the translating member is unchanged in any adjusted position.

The translating member may move toward and away from the fixed member, but this distance may be effectively irrelevant. However, the vertical position of the translating member, with respect to the fixed member, effectively adjusts the height of the hitch secured to the translating member.

An adjustment mechanism may be provided to adjust the position of the translating member with respect to the fixed member. In one embodiment, such an adjustment mechanism may rely on a link extending between a first position on the fixed member and a second position on the translating member. For example, a screw and nut, a turnbuckle, or the like may be placed between the fixed member and the translating member to effect a change in their spacing, effectively changing the position of the rotating links accordingly.

In one presently preferred embodiment, the rotating links may be adapted to overlap one another. The overlapping portions may be provided with a series of apertures. The apertures may be positioned so as to align in a correspondence.

That is, each aperture of the first rotating link may align with an aperture corresponding thereto in the second rotating link in order to receive a pin fixing the relative positions of the two rotating links. A pattern for the apertures in the rotating links may be selected to be effective to provide a maximum number of positions at which at least one pair of corresponding apertures in the first and second links, respectively, is aligned.

In one embodiment of an apparatus in accordance with the invention, the fixed portion may either include or be mounted to a trunnion to be received into a receiver mounted to a towing vehicle. The hitch support may be reversible in a vertical direction. That is, the hitch support may be rotated 180° about a longitudinal axis of the trunnion. Thus the trunnion may be placed into the receiver right-side-up, or upside-down.

The fixed portion may be offset vertically with respect to the trunnion. That is the fixed portion may not be centered in a vertical direction with respect to the longitudinal axis of the trunnion. Similarly, the hitch may be mounted with a vertical bias due to an offset in the positioning of the translating member with respect to the two rotating members.

Thus, the rotation of the trunnion, with respect to the longitudinal axis of the trunnion, may bias the initial and final positions of the translating portion substantially. The translating portion may have a comparatively high initial position and final position, as well as a reversed arrangement providing a comparatively low initial position and low maximum position.

BRIEF DESCRIPTION OF THE DRAWINGS

The foregoing and other objects and features of the present invention will become more fully apparent from the following description and appended claims, taken in conjunction with the accompanying drawings.

Understanding that these drawings depict only typical embodiments of the invention and are, therefore, not to be considered limiting of its scope, the invention will be described with additional specificity and detail through use of the accompanying drawings in which:

FIG. 3 is a right side elevation view of the apparatus of FIG. 1 in a low-biased position;

FIG. 4 is a right side elevation view of the apparatus of FIG. 3 in a low-biased position, and adjusted to a lowest position;

FIG. 5 is a right side elevation view of an apparatus made in accordance with the invention, positioned in a high-biased position and adjusted at a maximum elevation.

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 5, is not intended to limit the scope of the invention, as claimed, but it is merely representative of the presently preferred embodiments of the invention. The presently preferred embodiments of the invention will be best understood by reference to the drawings, wherein like parts are designated by like numerals throughout.

Figure 1:
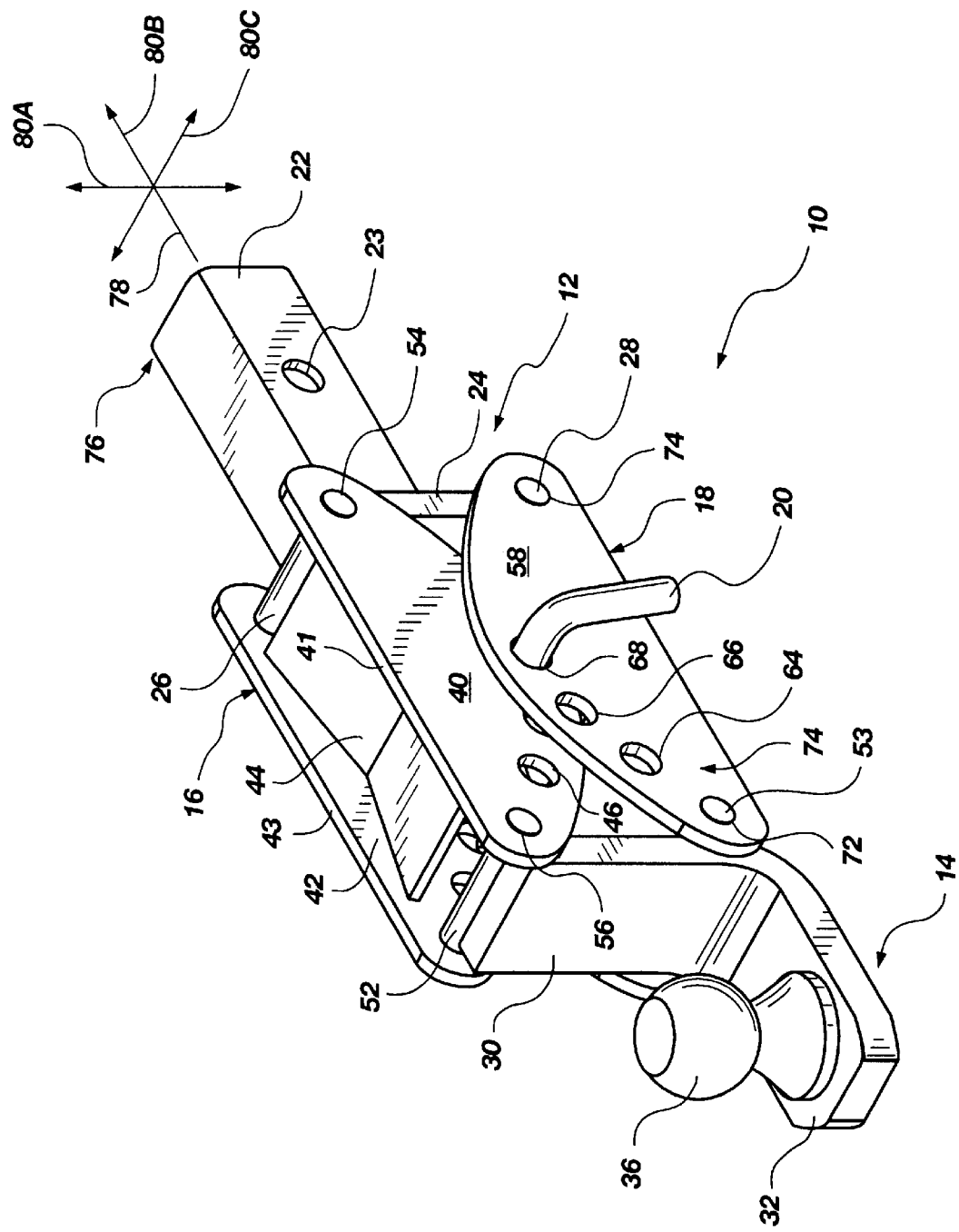
FIG. 1 is a front quarter isometric view of an apparatus made in accordance with the invention.

Referring to FIG. 1, an apparatus is illustrated for providing vertical adjustability in a hitch. The apparatus 10 attaches at a receiver end 76 to a receiver fixed to a vehicle. A hitch 36 secured to an apparatus 10 may be used to tow a trailing vehicle.

Figure 2:
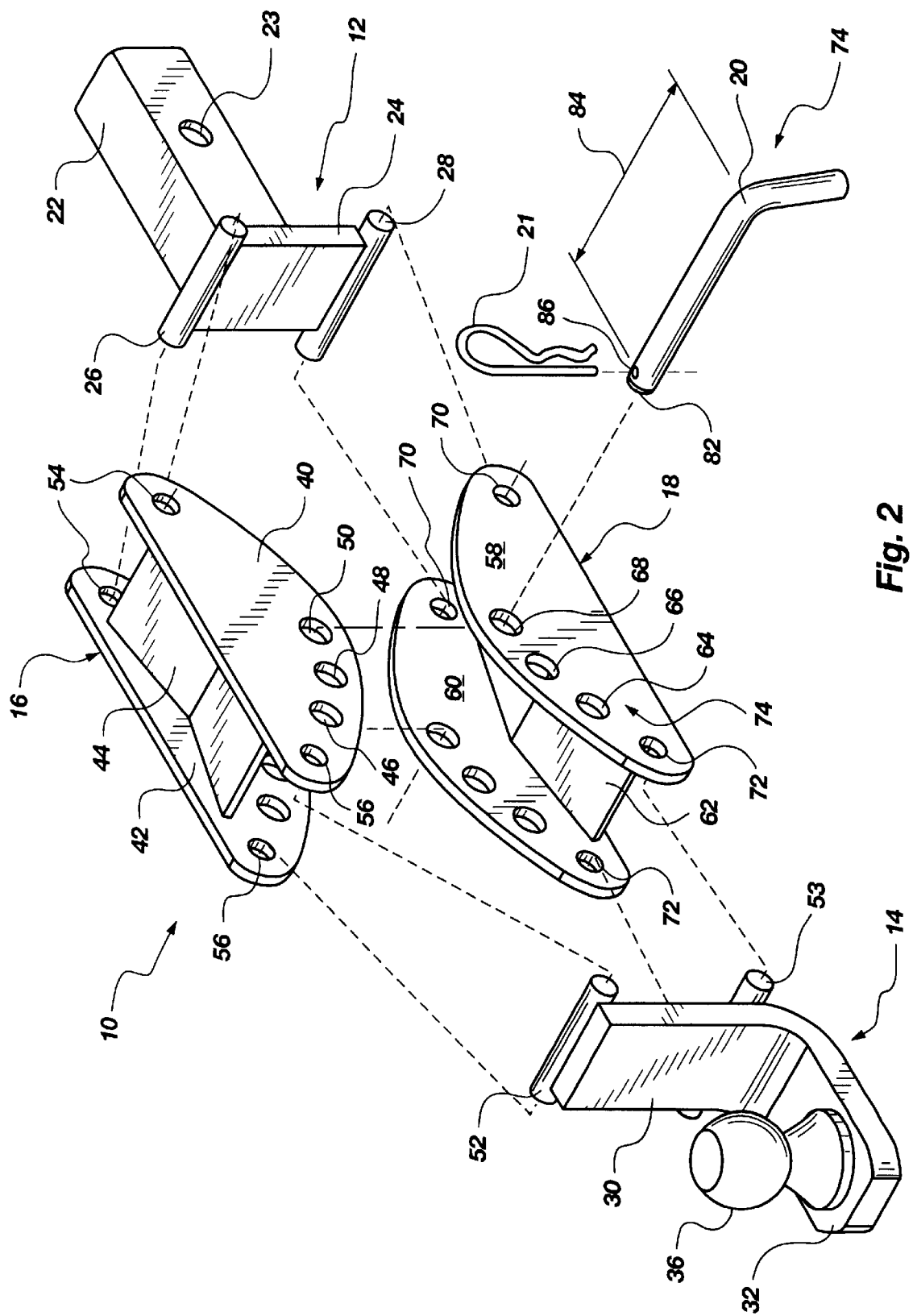
FIG. 2 is a front quarter isometric exploded view of the apparatus of FIG. 1.

Reference is next made to FIG. 2, which illustrates in more detail an exploded view of the parts comprising the apparatus 10 of FIG. 1. Those of ordinary skill in the art will, of course, appreciate that various modifications to the apparatus 10 of FIGS. 1–2 may easily be made without departing from the essential characteristics of the invention, as described in connection with FIGS. 1–2.

Thus, the following description of the apparatus 50 and method, in accordance with the illustrated embodiment of the invention, is intended only as an example, and it simply illustrates one presently preferred embodiment of the invention as claimed herein.

Referring to FIG. 1–5, a apparatus 10 may include a base link 12 connected to a hitch link 14 by a top link 16 and bottom link 18, forming a four bar linkage. A pin 20 may be secured by a lynch pin 21 to fix the top link 16 with respect to the bottom link 18.

In one presently preferred embodiment, a trunnion 22 may be fastened to a base plate 24 by welding or other suitable fastening mechanism, including bolting, riveting, and the like. In one presently preferred embodiment, welding may be used to provide a strong integral structure 12 or base link 12 comprising the trunnion 22 and base plate 24. An aperture 23 may be provided in the trunnion, for securing the trunnion to a receiver (not shown) on a towing vehicle.

A top base axle 26 may be secured to the base plate 24. Alternatively, the top base axle 26 may be secured to the top link 16 with a sleeve (not shown) welded or otherwise fastened to the base plate 24, thus acting as a journal to secure the axle 26.

A bottom base axle 28 may similarly be fastened, such as by welding to the base plate 24. Similarly, the axle 28 may be secured to the bottom link 18 in fixed relation, to be held by a sleeve (not shown) secured to the base plate 24. Thus, the top link 16 and bottom link 18 may be rotatably secured to the axles 26, 28, respectively, to rotate with respect to the base plate 24. The base link 12 may be secured by the trunnion 22 to a receiver of a towing vehicle, becoming a fixed link 12 or stationary link 12 with respect to the towing vehicle.

Similar to the base link 12, the hitch link 14 may be pivotably secured to the top link 16 and bottom link 18. The hitch link 14 may be formed as a single piece of material to provide a hitch plate 30 and tongue plate 32. The apparatus 10 or four-bar linkage 10 may include a hitch plate 30 secured between the top link 16 and the bottom link 18. The hitch plate 30 and tongue plate 32 may be fastened together or integrally formed in order to provide to different orientations.

For example, the hitch link 30, in one presently preferred embodiment, may move parallel to the base plate 24. Meanwhile, the tongue plate 32 may be oriented to receive, through an aperture 34, the fastener of a hitch 36 secured by a nut 38. Conventionally, hitches 36 are oriented with a longitudinal axis in a vertical direction. Therefore, it is advantageous for the tongue plate 32 to be oriented horizontally.

In one presently preferred embodiment, the effective top link extends between the axle 26 and the axle 52. Similarly, the effective bottom link 18 extends between the axle 28 and the axle 53. Thus, regardless of any extraneous shape beyond that needed to connect the links 16, 18 between the axles 26, 28 respectively, and the axles 52, 53, respectively, the links 16, 18 may effectively be parallel bars.

The links 16, 18 need not be absolutely parallel. Nevertheless, a parallel arrangement assures that the orientation of the hitch 36 does not change regardless of the rotation of the links 16, 18 about the axles 26, 28, and 52, 53, respectively.

An adjustment mechanism 74 may be provided to position the hitch link 14 with respect to the base link 12. For example, a turnbuckle extending between the axle 26 and the axle 53 may fix the four-bar linkage 10 by forming a pair of triangles. The two triangles would extend from the axle 53 to the axle 52 to the axle 26 and from the axle 53 to the axle 28 to the axle 26, respectively.

Similarly, although changing the loading on the apparatus 10, a turnbuckle-like apparatus may be connected between the axles 52, 28 with similar effect. Turning a turnbuckle effectively lengthens or shortens an included bolt, changing the spacing between the ends of the turnbuckle (and the axles connected at either end). Other support mechanisms, including cables, chain links in a slot, or the like may be used to restrain the apparatus 10 at a particular position.

In one presently preferred embodiment, the top link, may be formed by a face plate 40 positioned opposite a face plate 42 across a web 44. The web 44 may be straight, but is advantageously formed in a bent shape as illustrated. Manufacturing is simplified and strength may be increased by employing a bent web 44 between the face plates 40, 42. The face plates 40, 42 may be extended away from their edges 41, 43, proximate the axles 26, 52.

Thus, the face plates 40, 42 may be positioned to overlap or engage the bottom link 18. Apertures 46, 48, 50 may be provided through the face plates 40, 42 as part of a method of adjustment or adjustment mechanism 74.

Meanwhile, a top hitch axle 52 and by a top base axle 26 may be fitted to top hitch apertures 56 and top base apertures 54, respectively, in the face plates 40, 42. The top base aperture 54 and top hitch aperture 56 may extend completely through each of the face plates 40, 42.

Alternatively, the apertures 54, 56 may extend only partially through the face plates 40, 42, providing a capture function. To the extent that the axles 26, 52 are fixed to the base plate 24 and hitch plate 30, either approach to the apertures 54, 56 may serve equally well.

In similar manner, the bottom hitch axle 53 and the bottom base axle 28 may be secured to extend between the face plate 58 and the face plate 60 of the bottom link 18. A web 62 may space apart, and secure together, the face plate 58 and the face plate 60. The webs 44, 62 may be welded in place, in one presently preferred embodiment, for durability, reliability, strength, permanence, and ease of manufacture.

The apertures 64, 66, 68 may be formed in the face plates 58, 60. The apertures 46, 48, 50, 64, 66, 68 may be sized to receive the pin 20. The apertures 70, 72 form a bottom base aperture 70 and bottom base aperture 72 for receiving the bottom base axle 28 and bottom hitch axle 53, respectively. The bottom hitch aperture 72 and bottom base aperture 70 may be manufactured identically to, or different from, the top base aperture 54 and top hitch aperture 56. However, in one presently preferred embodiment, a single pattern may be selected for all of the face plates 40, 42, 58, 60. Thus, inventory of a single part may be maintained. Similarly, the webs 44, 62 may be formed identically, further minimizing the number of different parts inventoried to produce the apparatus 10.

The apertures 46, 48, 50 may be distributed in a pattern to intersect with various of the apertures 64, 66, 68. Intersection may occur at positions selected to provide a wide (for example, maximum) range of positions of the hitch 36 with respect to the trunnion 22. One may note that as a face plate 40, 42 or 58, 60 rotates about a respective axle 26, 28, each of the respective apertures 46, 48, 50 and 64, 66, 68, respectively, rotates about the respective axle 26, 28. Thus, a series of intersections of arcs provides a hole pattern for the apertures 46, 48, 50, 64, 66, 68. In one presently preferred embodiment, the positions of the top link 16 with respect to the bottom link 18 are selected such that the face plates 40, 42, 58, 60 may all be manufactured to be identical to one another.

The hitch 36 may be elevated or depressed in a vertical direction 80A. The apparatus 10 is secured in a horizontal degree of freedom corresponding to a forward-backward direction 80B. The aperture 23 and the trunnion 22 may be used to secure the receiver end 76 of the trunnion 22 in the receiver of a towing vehicle. The hitch 36 (and the associated hitch link 14 with its components 30, 32) is constrained in the horizontal (front-rear) direction 80B, although some change in this direction 80B will occur in association with the changes in the vertical direction 80A. This coupling of motion is related to the arcuate movement of the top link 16 and bottom link 18.

However, even in the absence of the pin 20, the movement in the vertical direction 80A and the horizontal direction 80B is limited. Thus, although the positioning of the top link 16 with respect to the bottom link 18 is dependent upon the pin 20, securement of a towed vehicle attached to the hitch 36 is not in question. In a worst case, with a sheared pin 20, the hitch 36 can safely move to its highest or lowest relative position with respect to the trunnion 22 or base link 12.

In one presently preferred embodiment, within the tolerances required for effective manufacture, the hitch 36 and the members 12, 14, 16, 18 of the apparatus 10 are constrained in the lateral direction 80C. This degree of freedom is completely foreclosed.

Referring to FIGS. 1–5, and more particularly FIGS. 3–5, an apparatus 10 may be embodied as a four-bar linkage 10 adapted to support a hitch 36 behind a towing vehicle (not shown). A trunnion 22 may be adapted to be inserted into a receiver (not shown) fixed to the towing vehicle, the trunnion 22 being secured by a pin (not shown) extending through an aperture 23 in the trunnion 22.

A height in a vertical direction 80A (see FIG. 1) may be selected by inserting a pin 20 (see FIGS. 1-2) inserted into one of the apertures 46, 48, 50 aligned with one of the apertures 64, 66, 68. In FIG. 3, the aperture 50 in the top link 16 (through the face plates 40, 42) issued. In FIG. 4, the aperture 46 is aligned with the aperture 68 to provide a lower-most position of the hitch 36. Similarly, the aperture 64 may be aligned with the aperture 50 to position the hitch 36 of FIG. 4 in an upper-most position, with respect to the bias illustrated.

In FIGS. 3-4, the bias is downward, that is, the base plate 24 is attached to the trunnion 22 to extend downwardly therefrom. Thus, the axle 26 is relatively close to the trunnion 22, while the axle 28 is positioned relatively farther away from the trunnion 22 than is the axle 26. Similarly, the hitch 36 is positioned inside the angle formed by the hitch plate 30 and tongue plate 32.

By contrast, the apparatus 10 of FIG. 5 is upwardly biased. The upward bias may be provided by rotating the trunnion 22 180° from the position of FIG. 4. The hitch 36 may be removed from the tongue plate 32 and reattached, rotated 180° with respect to the tongue plate 32 but in the same orientation as in FIG. 4. Thus, the relative position of the hitch 36 above the trunnion 22 is considerably higher for the apparatus 10 of FIG. 5 than would be the hitch 36 of FIG. 4 when the top link 16 is raised to the maximum height available. If FIG. 5 were drawn with the hitch link 14 oriented exactly as the hitch link 14 of FIG. 4, leaving the trunnion 22, top link 16, and bottom link 18 as they are illustrated in FIG. 5, one can see that the top of the hitch 36 would extend to some level in a vertical direction 80A (to approximately the aperture 64 in FIG. 5). Thus, considerable additional altitude is available by reversing the bias of the apparatus 10 between the configurations of FIG. 4 and FIG. 5.

Noting the symmetry of the face plates 40, 42, 58, 60, one will note that, at one extreme, the aperture 68 may be aligned with the aperture 46. At a mediate position, the aperture 50 may be aligned with the aperture 68. At the opposite extreme position, the aperture 64 may be aligned with the aperture 50. Moreover, the aperture 66 may be aligned with the aperture 50 and the aperture 48 may be aligned with the aperture 68 at two other intermediate points.

Thus, the trunnion 22 may be reversed. When the trunnion 22 is reversed (upside-down versus right-side-up) and the base plate 24 and hitch plate 30 are biased, ten positions are available. Five positions of the top link 16 with respect to the 18 are possible in a first orientation of the trunnion 22, and five positions are available in a reversed orientation of the trunnion 22 or base link 12. A user may easily lift the tongue plate 32 or the hitch link 14, rotating the top link 16 and bottom link 18.

A tapered end 82 on the pin 20, may be urged against the face plate 40, 42 through the aperture 68, 66, 64 desired for positioning the hitch 36. As the proper, selected aperture 46, 48, 50 comes into alignment with the tapered end 82 of the pin 20, the tapered end 82 may urge final alignment between the respective apertures 46, 48, 50 with the selected aperture of the apertures 64, 66, 68. The pin 20 may then be extended through the bottom link 18 for its full throw 84, or effective length 84.

The aperture 86, may then receive the lynch pin 21 to secure the pin 20 through the bottom link 18, and simultaneously through the top link 16. The pin 20 is loaded in shear, providing substantial support. In any position, the pin 20 maintains a vertex shared by two triangles.

For example, in FIG. 4, one structural triangle extends from the axle 53 or aperture 72 to the pin 20 in the apertures 68, 46, to the axle 28 or aperture 70. The other triangle, in FIG. 4, extends from the axle 52 or aperture 56, to the apertures 68, 46 aligned by the pin 20, to the pin 26 or aperture 54.

Structural strength and rigidity are provided by the triangulation and the face plates 40, 42, 58, 60. The webs 44–62 may serve to space apart, secure together, stabilize, and strengthen the face plates 40, 42, 58, 60, thus forming the top link 16 and bottom link 18.

One will note that the assembly is particularly compact. No extraneous parts extend outside the working envelope (the volume of space occupied by the parts of the apparatus 10 in use) of the apparatus 10, when not in use.

From the above discussion, it will be appreciated that the present invention provides an adjustable hitch support having a relatively light weight and small volumetric envelope. The apparatus is simply and easily adjustable by a single user, and between a plurality of positions. The apparatus 10 is also reversible by rotating the apparatus 10 about a longitudinal axis 78. Thus by inserting the receiver end 76 into the receiver of a vehicle, in two different orientations, the height of a tongue plate 32 holding a hitch 36 may be biased up or down. Thereafter, the position in a vertical direction 80A may be adjusted by an adjustment mechanism 74, such as the pin 20 in apertures 64, 66, 68.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus for adjustably supporting, on a towing vehicle, a hitch adapted to draw a towed vehicle at a height, the apparatus comprising:

a base link adaptable to be securable in a fixed relation to the towing vehicle;

a first link pivotably associated by a first pivot proximate one end thereof with the base link, the first link further comprising a first face plate having a longitudinal direction with a first plurality of apertures disposed therealong within a first expanse, the first face plate extending transversely substantially orthogonally to the longitudinal direction toward a second link;

the second link, pivotably associated by a second pivot proximate one end thereof with the base link, and spaced from the first link, the second link further comprising a second face plate extending in substantially the longitudinal direction, with a second plurality of apertures disposed therealong within a second expanse, the second face plate extending transversely toward the first link to place the first face plate and second face plate laterally proximate one another in a movable and overlapping relation;

a hitch link adapted to receive the hitch, the hitch link being pivotably associated, proximate a first end thereof, with the first link at a third pivot, proximate the other end of the first link, and being pivotably associated at a fourth pivot, proximate a second end thereof, to the second link and adapted to maintain the hitch at a constant angle with respect to the ground during adjustment of the height and independent from the height selected;

first and second lines exending between the first and third pivots, and between the second and fourth pivots, respectively;

the first face plate extending toward the second line;

the second face plate extending toward the first line;

the first and second expanses each being located between the first and second lines; and an adjustment mechanism comprising a pin, extending laterally between the first link and second link, through a first aperture selected from the first plurality of apertures and a second aperture selected from the second plurality of apertures, to be loaded substantially exclusively in shear.

2. An apparatus for adjustably supporting, on a towing vehicle, a hitch adapted to draw a towed vehicle at a height, the apparatus comprising:

first, second, third, and fourth pivots arranged substantially in a parallelogram defining an expanse region therewithin;

a base link adaptable to be securable in fixed relation to the towing vehicle, a top link, comprising a first plate extending longitudinally from the base link at the first pivot, provided with a first plurality of apertures disposed longitudinally therealong within the expanse region, extending substantially orthogonally thereto toward a bottom link, and being pivotably associated at the second pivot proximate one end thereof with the base link;

a bottom link, comprising a second plate extending longitudinally from the base link, provided with a second plurality of apertures disposed longitudinally therealong within the expanse region, pivotably associated proximate one end thereof with the base link, and spaced from the top link to extend transversely theretoward in a laterally overlapping, mutually pivotable relation, by which the bottom link is laterally captured by the top link;

a hitch link adapted to receive the hitch, the hitch link being pivotably associated by the third pivot, proximate a top end thereof, with the top link, proximate the other end of the top link, and being pivotably associated by the fourth pivot, proximate a bottom end thereof, to the bottom link;

the top link extending toward a first line between the second and fourth pivots, and the bottom link extending toward a second line between the first and third pivots; and an adjustment mechanism comprising a removable member adapted to extend laterally between, and fixing with respect to one another, a first aperture selected from the first plurality of apertures and a second aperture selected from the second plurality of apertures, for supporting substantially exclusively a shearing load therebetween to adjust the height of the hitch link.

3. The apparatus of claim 2 wherein the removable member further comprises a monolithic connector.

4. The apparatus of claim 2, wherein the top link further comprises a brace fixing the first plate to another first plate laterally spaced therefrom to effect the capture of the bottom link therebetween.

5. The apparatus of claim 2, wherein the bottom link further comprises a brace fixing the second face plate laterally to another second face plate to form the bottom link.

6. The apparatus of claim 2, wherein the base link is adapted to be selectively movable with respect to the vehicle between a first fixed position and a second fixed position effective to reverse the respective positions of the bottom link and top link.

7. The apparatus of claim 2 further comprising a first axle adapted to pivotably connect the base link to the top link and a second axle adapted to pivotably connect the base link to the bottom link.

8. The apparatus of claim 2 further comprising an axle adapted to pivotably connect the hitch link to the top link and another axle adapted to pivotably connect the hitch link to the bottom link.

9. An apparatus formed as a four-bar linkage effective to adjustably position a hitch on a vehicle, the apparatus comprising:

a stationary link positioned to maintain, in use, a fixed position with respect to the vehicle;

a first pivoting link having substantially mutually orthogonal longitudinal, lateral, and tranvserse directions associated therewith and being positioned to pivot about a first axle with respect to the stationary link;

a second pivoting link positioned to pivot about a second axle with respect to the stationary link simultaneously with, and sweeping through substantially the same angle as, the first pivoting link; and a translating link positioned to pivot about third and fourth axles, with respect to the first pivoting link and the second pivoting link, respectively, to translate with respect to the stationary link without rotation, the translating link being adapted to receive and support the hitch; and a pin extending through the first and second pivoting links simultaneously, and orthogonally thereto, to support, in shear, a loading therebetween;

the second pivoting link further comprising a plate, the plate having an expanse extending transversely toward the first pivoting link and a line extending between the first and third axles, and being perforated with a first plurality of apertures distributed over a second expanse positioned between the first, second, third, and fourth axles;

the first pivoting link further comprising a pair of plates, extending transversely toward the second pivoting link and a line extending between the second and fourth axles to laterally capture the plate therebetween, the pair of plates being perforated with a second plurality of apertures distributed over a first expanse positioned between the first, second, third, and fourth axles for selectively receiving, simultaneously, the pin therethrough and through one of the first plurality of apertures in the second pivoting link to fix the first and second pivoting links with respect to one another.

\* \* \* \* \*

UNITED STATES PATENT AND TRADEMARK OFFICE
CERTIFICATE OF CORRECTION

PATENT NO.    : 5,934,698
DATED         : August 10, 1999
INVENTOR(S)   : Despain It is certified that error appears in the above-identified patent and that said Letters Patent is hereby corrected as shown below:

Column 9,
Line 1, after "first link", please insert therefor -- and a second line --.
Line 13, please delete "exending", and insert therefor -- extending --.

Signed and Sealed this

Twenty-second Day of October, 2002

Attest:

Attesting Officer

JAMES E. ROGAN
Director of the United States Patent and Trademark Office